United States Patent [19] [11] Patent Number: 4,900,119
Hill et al. [45] Date of Patent: Feb. 13, 1990

[54] WAVELENGTH SELECTIVE OPTICAL DEVICES USING OPTICAL DIRECTIONAL COUPLER

[75] Inventors: Kenneth O. Hill, Kanata; Derwyn C. Johnson; Francois Bilodeau, both of Nepean; Sylvain Faucher, Hull, all of Canada

[73] Assignee: Canadian Patents & Development Ltd., Ottawa, Canada

[21] Appl. No.: 176,683

[22] Filed: Apr. 1, 1988

[51] Int. Cl.[4] .......................... G02B 6/26; G02B 6/42
[52] U.S. Cl. .................................................. 350/96.15
[58] Field of Search ....................................... 350/96.15

[56] References Cited

PUBLICATIONS

Kawasaki et al.; "Narrow-Band Bragg Reflectors in Optical Fibers"; *Optics Letters;* vol. 3, p. 66, Aug. 1978.
K. O. Hill et al., "Photosensitivity in Optical Fiber . . . Fiber Fabrication", Appl. Phys. Lett., 32 (1), May 15, 1978.
K. O. Hill et al., "Narrow-Bandwidth Optical Waveguide Transmission Filters", Electronics Letters, vol. 23, No. 9, pp. 465–466, Apr. 23, 1987.
K. O. Hill, "New Design Concept for a . . . and Combiner", Electronics Letters, vol. 23, No. 13, pp. 668–669, Jun. 18, 1987.
Inoue et al., "Tunable Optical . . . Transmission System", Electronics Letters, vol. 21, No. 9, Apr. 25, 1985.
Stolen et al., "In-Line Fiber-Polarization-Rocking Rotator and Filter", Optics Letters, vol. 9, No. 7, Jul. 1984.
Matsuhara et al., "Optical-Waveguide Filters: Synthesis", J. of Opt. Soc. of America, vol. 65, No. 7, Jul. 1975.
Lissberger et al., "Narrowband Position-Tuned Multiplayer Interference Filter for Use in Single-Mode-Fibre Systems", Electronics Letters, vol. 21, No. 18, 1985.
Yataki et al., "All-Fibre Wavelength . . . Fused-Taper Coupler", Electronics Letters, vol. 21, No. 6, Mar. 14, 1985.

*Primary Examiner*—William L. Sikes
*Assistant Examiner*—Robert E. Wise
*Attorney, Agent, or Firm*—Yoshiharu Toyooka

[57] ABSTRACT

New types of narrowband wavelength selective optical devices are described. Various configurations are possible, according to the invention, that perform as narrowband wavelength selective transmission or reflection filters or as narrowband wavelength selective optical taps or combiners. The optical devices of the invention include a 3 dB optical directional coupler and wavelength selecting elements such as Bragg reflection gratings or Fabry-Perot resonators usually positioned in optical symmetry with respect to the directional coupler. Two or more wavelength selecting elements can be used to obtain desired filtering characteristics.

10 Claims, 2 Drawing Sheets

WAVELENGTH SELECTIVE OPTICAL DEVICES USING OPTICAL DIRECTIONAL COUPLER

FIELD OF THE INVENTION

The present invention relates to narrowband wavelength selective optical devices and in particular is directed to devices that include 3 dB optical directional couplers and wavelength selective optical reflection or transmission elements such as Bragg reflection filters or Fabrey-Perot resonators.

BACKGROUND OF THE INVENTION

The bandwidth potentially available in optical fiber communication systems is known to be extremely large. The exploitation of this bandwidth usually requires communication systems designed to carry information in channels closely spaced in optical wavelength or frequency. The use of wavelength division multiplexing (WDM) and demultiplexing (WDD) is often proposed. WDM/WDD provides a convenient, flexible method for integrating diverse digital and analogue signals onto a distribution network and is also a means for selecting different groups of subscribers on the network. The practical implementation of WDM/WDD requires wavelength selective optical transmission devices such as filters and wavelength selective taps (or combiners). The filter transmits only a narrow band of optical frequencies (wavelengths), on the order of a gigahertz or less. The filters are useful as a means of selecting among WDM channels and also for reducing shot noise levels at the detector by removing out-of-band signals. The wavelength selective tap adds or extracts light of one or more wavelengths to or from light containing a number of other different discrete wavelengths that are assumed to be already propagating in a fiber.

A variety of techniques have been proposed for the design of narrow band filters. Filters using gratings are described in Opt. Lett., 1978, No. 3, pp 66–68 "Narrowband Bragg Reflectors in Optical Fibers" by B. S. Kawasaki et al., Electron Lett., 1985, No. 21, pp 789–799, "Narrowband Position-tuned Multilayer Interference Filter for Use in Single-mode Fiber Systems" by P. H. Lissberger et al teaches filters with dielectric multilayer films. Electron. Lett., 1985, No. 21, pp 248–249, "All-fiber Wavelength Filters using Concatenated Fused-taper Couplers" by M. S. Yataki et al, on the other hand, uses optical couplers for filters. Filters using optical interferometers and polarizing devices are described in Electron. Lett., 1985, No. 21, pp. 387–389, "Tunable Optical Multi/Demultiplexer for Optical FDM Transmission Systems" by K. Inoue et al and Opt. Lett., 1984, No. 9, pp 300–302, "In-line Fiber-polarization-rocking Rotator and Filter" by R. H. Stolen et al.

In practise, the filters that have the narrowest bandwidth are of the reflection grating type or the interferometer type. The above-referenced article by Kawasaki et al reports 50 MHz FWHM reflection filters with extremely large free spectral range determined by the harmonics of the fundamental Bragg frequency of the grating.

OBJECT OF THE INVENTION

It is therefore an object of the present invention to provide narrowband wavelength selective optical devices.

It is a further object of the present invention to provide narrowband wavelength selective optical filters.

It is another object of the present invention to provide narrow-band wavelength selective optical taps.

SUMMARY OF THE INVENTION

Briefly stated, a wavelength selective optical device, according to the present invention, comprises an input port, an output port and a 3 dB optical directional coupler connecting the said ports. The device further includes wavelength selective resonance circuit means which is connected in optical symmetry with respect to the said directional coupler. The said wavelength selective resonance circuit means comprises wavelength selecting means is capable of reflecting back light having certain wavelengths and transmitting through light having all other wavelengths. When singularly polarized light is applied to the input port, the light having the said certain wavelengths and being reflected back from the said wavelength selecting means propagates to the output port.

BRIEF DESCRIPTION OF THE DRAWINGS

For a more complete understanding of the present invention and for further objects and advantages thereof, references may be made to the following description taken in conjunction with the accompanying drawings in which.

DETAILED DESCRIPTION OF PREFERRED EMBODIMENTS OF THE INVENTION

Figure 1:
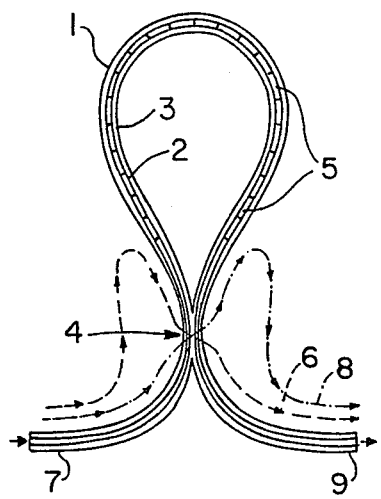
FIG. 1 is a schematic diagram of a wavelength selective optical device according to one embodiment of the present invention.

FIG. 1 shows a schematic diagram of the optical device according to one embodiment of the present invention. The device comprises a loop of a monomode optical fiber 1 having a core 2 and a cladding 3. A 3 dB optical directional coupler 4 is coupled to the loop as shown. The coupler is of the fused taper type in this embodiment. A reflection filter 5 is integral to the monomode optical fiber and is made of a distributed feedback reflection filter (Bragg reflection grating) having a resonant wavelength $\lambda_0$. The filter 5 is situated symmetrically optically midway in the fiber loop. An input port 7 and an output port 9 are connected to the 3 dB coupler 4.

Figure 2:
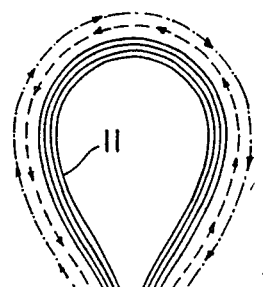
FIG. 2 is a schematic diagram of an optical device having no filters and functioning as an optical reflector.

The operation of the device is explained best by describing first what happens in a looped 3 dB coupler which does not contain the Bragg reflection grating. Such a device is shown in FIG. 2 which illustrates a loop of a monomode optical fiber 11, a 3 dB optical directional coupler 13, an input port 17 and an output port 19. Light entering the input port 17 leaves the coupling region of the coupler 13 equally distributed in power from each of the two coupler outputs. Because the coupler outputs are connected to each other, thereby forming a loop, light can arrive at the output port 19 via two different paths shown by two arrowed broken lines 21 and 23. Light that travels to the output port 19 following path 21 couples across the directional coupler 13 twice, whereease the rest of the light which reaches the output port 19 by path 23 also passes twice through the coupler 13 but without being coupled across. It is known that light which is coupled in a 3 dB coupled-mode directional coupler experiences a $\pi/2$ relative phase shift with respect to the light that passes through uncoupled. Thus the light arriving at the output port 19 by one path is out of phase by $\pi$ with respect to the light arriving at the output port 19 by the other path. Because both fields are of equal amplitude, complete interferometric cancellation is obtained if the fields are copolarized. In a similar manner, light returns at the same time to the input port 17 also via two different paths but only in this case the light is in-phase and reinforcement occurs. The device shown in FIG. 2 therefore acts as a total reflector and can be used as a mirror in a fiber laser.

Referring back to FIG. 1, now consider the operation of a fiber loop containing Bragg reflection grating. It is assumed for simplicity that the grating is positioned exactly midway within the loop and that the reflectivity of the grating is 100% for Bragg-resonant light of wavelength $\lambda_0$ that is to say, it is an overcoupled Bragg reflection grating: $KL >> 1$, where L is the length of the region of stationary phase for wavelength $\lambda_0$ and K is the coupling coefficient of coupled-mode theory. To explain further, K is given by:

$$K = \frac{\pi n_1}{\lambda_0}$$

where $\lambda_0$ is the wavelength of the light being reflected and $n_1$ is the amplitude of variation of the refractive index of the grating. The reflectivity of the grating is then calculated as:

$$\eta = \tan h^2(KL).$$

As an example, $KL=1$ should give about 58% reflectivity. Reflectivity of 100% can be easily realized by $KL >> 1$. The bandwidth in this case is expressed as:

$$\frac{\Delta \lambda_0}{\lambda_0} = \frac{4|K|\lambda_0}{2\pi n}$$

where n is the average refractive index of the grating.

The presence of the grating will not affect non-Bragg resonant-wavelength light and in this case the device operates as reflector, just like the looped 3 dB coupler that has been described above. Therefore the transmitted output of the device is zero. In contrast, Bragg-resonant light of wavelength $\lambda_0$ will be reflected completely by the distributed-feedback reflection filter located in the fiber loop and will travel along two paths 6 and 8 shown in FIG. 1 by arrowed broken lines. This leads directly to interferometric reinforcement and maximum throughput for this wavelength at the output port of the device. FIG. 1 delineates the only two possible paths 6 and 8 that the light can follow to arrive at the output port of the device. Irrespective of which path it traces, light couples across the directional coupler only once, and therefore experiences the same phase shift in propagating through the coupler. Thus, provided the optical paths for the two routes in the fiber loop proper are also identical (controlled by the symmetric positioning of the grating in the loop and the assumed symmetry of the device) and the polarization of the light is maintained (or depolarization compensated for if it occurs), coherent reinforcement takes place at the output and light at wavelength $\lambda_0$ is transmitted through the device. A similar analysis of the relative phase shifts for light that is returned back to the input port at the same time, also by two paths, shows complete cancellation at the input port under the assumed Bragg-resonant conditions. The device thus acts as a transmission filter whose bandwidth is essentially that of the Bragg reflection grating, transforming a reflection filter to a transmission filter. By doing this, a very large gain in transmission filter responses finnese is obtained, with a free spectral range limited only by the presence of the second-order Bragg-resonance and the spectral range over which the coupler maintains 3 dB splitting.

Should the grating not be centered in the loop, two-beam unequal-path interference effects within the transmission bandpass of the filter give rise to a comb-like filter response inside a bandpass envelope. Thus, the bandwidth of a coarse (short and therefore low finesse) Bragg reflection grating can be narrowed using the transmission channelling that results from placing the grating asymmetrically in the fiber loop.

In various practical applications, it is often desired that no light be reflected back to input ports. Therefore, in FIG. 3, another embodiment of the invention is shown for such applications. The embodiment includes a 3 dB optical directional coupler 24, a first input and a first output ports 25 and 26. In place of a loop of FIG. 1, a pair of open-ended monomode fibers 27 and 28 are provided, each including a identical Bragg reflection grating whose resonant wavelength is $\lambda_0$. The Bragg reflection gratings 29 and 30 are optically symmetrically positioned with respect to the directional coupler 24. Each open-ended monomode fiber is equipped at its end with a light dissipator 31 and 32, such as light absorber or reflection inhibitor. The operation of the device is almost identical to that shown in FIG. 1 in the light of Bragg resonant wavelength $\lambda_0$ will emerge at the output port 26 while light of all non-Bragg resonant wavelengths will be dissipated by the light dissipators 31 and 32.

Figure 4:
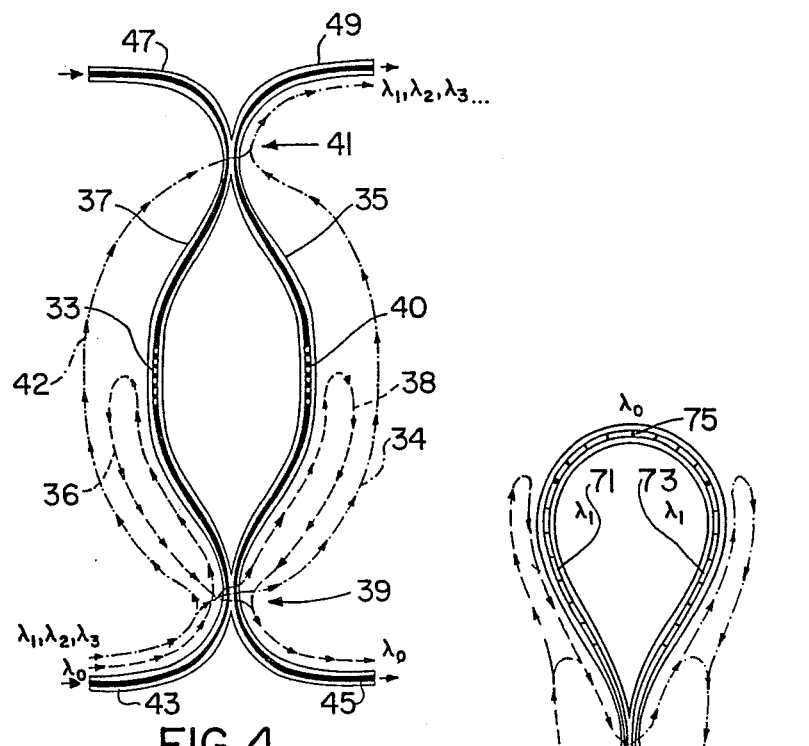
FIGS. 4, 5 and 6 are schematic diagrams of various wavelengths selective optical devices according to further embodiments of the invention.

FIG. 4 illustrates a schematic diagram of the wavelength selective tap according to another embodiment of the present invention. In the figure, the tap comprises a Mach-Zehnder interferometer with identical Bragg reflection gratings 40 and 33 (distributed feedback reflection filters) in each of the two arms 35 and 37. A first 3 dB optical directional coupler 39 and a second 3 dB optical directional coupler 41 are connected to each other by the arms 35 and 37. A first input port 43 and a first output port 45 are provided on the first directional coupler 39 and a second input port 47 and a second output port 49 are provided on the second directional coupler 41.

To explain the operation of the optical fiber tap, let us consider first, as in the case of the above-described filters, a Mach-Zehnder without the Bragg reflection gratings in the interferometer arms. Ideally, the two couplers forming the interferometer have 3 dB coupling ratios for all wavelengths of light that are propagating through the device. The optical path lengths for the two arms of the Mach-Zehnder are also assumed to be identical. Thus the interferometer is perfectly balanced. Light containing several discrete wavelength launched into input port 43 will be split evenly by the first 3 dB optical directional coupler 39, propagate via the two paths to the second 3 dB optical directional coupler 41, recombine and exit through the output port 49. The propagation light paths through the Mach-Zehnder for this situation are depicted as the arrowed broken lines 42 and 34 in the figure. Light consisting of wavelengths $\lambda_1, \lambda_2, \lambda_3, \ldots$, etc. which are not Bragg-resonant with the reflection filter will follow exactly the same paths in the wavelength-selective tap, just as if the gratings were not there. Note that there will be no light exiting at the second input port 47 due to cancellation of light because of the $\pi$ relative phase shift.

Now referring further to the figure, the effect of the reflection filters in the arms of the Mach-Zehnder on Bragg-resonant light of wavelength $\lambda_0$ is described. Again, ideally the reflection filters are located symmetrically, occupying the same relative position in both the interferometer arms. Both reflection filters are resonant with the same wavelength $\lambda_0$. Thus light at wavelength $\lambda_0$ entering the input port 43 is split evenly by the first 3 dB coupler 39 and propagates into the two arms 35 and 37 of the Mach-Zehnder as before. However, in this case the light in each of the arms of the interferometer is reflected back by the corresponding reflection filter towards the first 3 dB coupler 39 at the input end of the device. On reaching this 3 dB coupler, coherent recombination occurs and the light of wavelength $\lambda_0$ exits via the first output port 45.

The relevant paths through the device for light of wavelength $\lambda_0$ are shown by the arrowed broken lines 36 and 38 in the figures. The reason the light emerges from the first output port 45 rather than the first input port 43 is due to the $\pi/2$ relative phase shift that occurs between light that just passes uncoupled through the 3 dB directional coupler and light that is coupled across. The light emerging from the first output port 45 derives from light that propagates along two different paths 36 and 38 in which each path crosses the directional coupler 39 only once. Thus there is no relative phase difference between the light waves propagating along the two different paths and constructive interference occurs. However, any light emerging from the first input port 43 derives from light that propagates along two paths in which a phase difference of $\pi$ occurs, thereby resulting in destructive interference.

The physical effect is identical to that which occurs from light at the resonant wavelength that propagates through the narrowband filter described above in reference to FIG. 1. Thus, for a properly designed wavelength selective tap, if light containing several discrete wavelengths $\lambda_0, \lambda_1, \lambda_2, \ldots$ etc, is launched into the input port 43 of the device in the FIG. 4, the light at wavelength $\lambda_0$ will emerge from the first output port 45 and the light at the other wavelengths will exit at the second output port 49.

Furthermore, the device of FIG. 4 can function as a drop-and-insert tap in that a first light having wavelengths $\lambda_0, \lambda_1, \lambda_2 \ldots$ etc is launched into the first input port 43 and a second light having wavelength $\lambda_0$ carrying different data is sent into the second input port 47. In this instance the first light at wavelength $\lambda_0$ emerges at the first output port 45 and light having $\lambda_1, \lambda_2, \ldots$ etc combined with hight having wavelength $\lambda_0$ but carrying different data appears at the second output port 49.

Another consideration in the operation of the wavelength selective tap is the state of polarization of the light. In the above description of the operation of the device it is assumed that the polarization of the light is maintained throughout the device for all wavelengths. If the light of one polarization should couple to light in the orthogonal polarization, complete constructive interference is not obtained. This effect has been observed in Mach-Zehnder fiber interferometers and is termed polarization fading. This problem is most readily overcome by using polarization maintaining waveguides.

For the tap to function properly it is important that the Mach-Zehnder interferometer be balanced. If the interferometer is unbalanced, some of the light will exit from the second input port 47 and will be essentially lost. It may be necessary to provide means for adjusting the path length of one of the interferometer arms until the balanced condition is achieved to provide wideband operation. For this purpose, the light emerging from the second input port 47 can be monitored to determine when the balanced condition is obtained. Since the wavelength selective characteristics of the optical tap shown in FIG. 4 are determined by the spectral response of the Bragg reflection gratings rather than the Mach-Zehnder interferometer, the length of the arms of the Mach-Zehnder can be made sufficiently small to just accommodate the Bragg gratings. A small Mach-Zehnder is less sensitive to the problems of polarization fading and easier to package to maintain the balance condition under a variety of environmental conditions.

Figure 5:
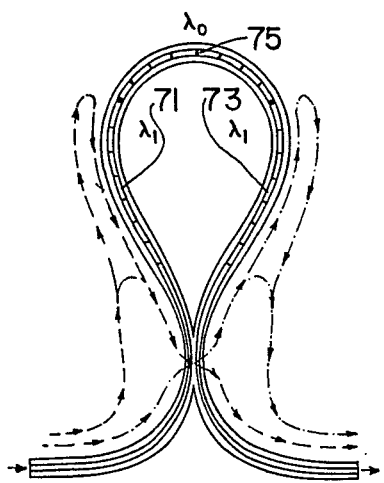

As a further embodiment of the present invention, FIG. 5 illustrates a looped optical device having more than one Bragg reflection gratings which have different resonant wavelengths. Therefore the Bragg reflection gratings 71 and 73 have resonant wavelength $\lambda_1$ and the grating 75 has a resonant wavelength $\lambda_0$. It should be easy to visualize that light having resonant wavelengths $\lambda_0$ and $\lambda_1$ propagates to an output port while light having any other wavelengths reflects back to an input port.

Figure 3:
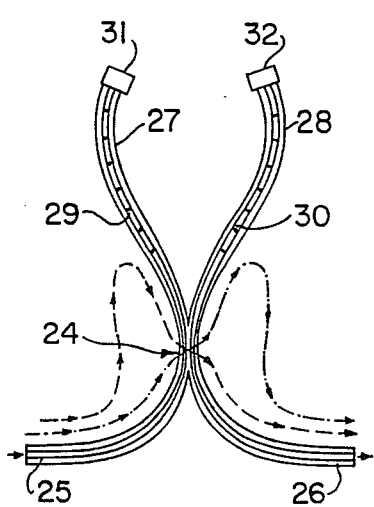
FIG. 3 is a schematic diagram of a wavelength selective optical device according to another embodiment of the invention.

A similar configuration is also possible using the arrangement of FIG. 3 in which each of the Bragg reflection gratings 29 and 30 is replaced with a plurality of sets of gratings, each having predetermined resonant wavelengths. It is further possible that instead of discrete reflection filters having discrete resonant wavelengths, chirping filters whose resonant wavelength is variable or a combination of various reflection filters can also be used to obtain a synthesized wavelength response characteristic in the device.

Figure 6:
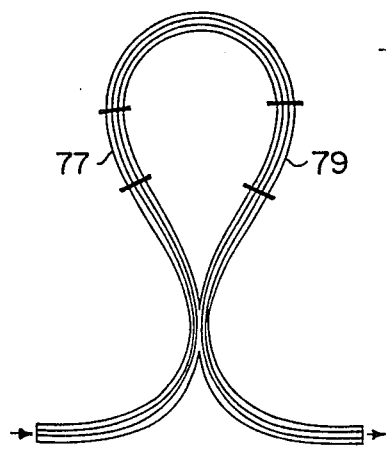

In FIG. 6, Bragg reflection gratings are replaced by two identical Fabry-Perot transmission resonators 77 and 79, each having a resonant transmission wavelength $\lambda_0$. The Fabry-Perot resonator transmits light having a resonant wavelength $\lambda_0$ and reflects light having any other wavelengths within its free spectral range. Therefore the device is readily understood in its operation in that light having a resonant wavelength reflects back to an input port and light having any other wavelengths propagates to an output port, thus transforming a transmission filter e.g. Fabry-Perot resonator, into a reflection device.

The use of a plurality of discrete reflection filters, transmission filters, chirping filters or a combination thereof is also a logical extension in the arrangement shown in FIG. 4 so that desired synthesized filter characteristics of a wavelength selective tap can be designed.

A variety of ways are available for constructing the wavelength selective optical devices of the present invention using optical fibers. The 3 dB optical directional coupler can be made using either fused biconical-taper or polished coupler technology. In the case of fused coupler, 3 dB coupling can be achieved either by terminating coupler fabrication when 50% coupling is obtained at the required resonant wavelength or by postfabrication flex-tuning of the coupler. Obviously, flex-tuning provides means of making a tunable-wavelength 3 dB coupler all fiber reflector. An approach that yields 3 dB couplers with reduced wavelength sensitivity is to etch the fiber differentially before initiating taper-coupler fabrication such that maximum coupling of 50% is obtained. However, such wavelength-flattened 3 dB couplers do not provide the required $\pi/2$ relative phase shift on crossover and their use in wavelength selective devices of this invention therefore requires adjustment of the position of the reflection elements away from symmetry to compensate to give the required $\pi/2$ phase shift.

Several methods are also available for fabricating Bragg reflection gratings (distributed feedback filter) in optical fiber. For example narrowband fiber Bragg reflection gratings have been made by etching corrugations into the core of a fiber mounted in one half of a polished coupler block. The best approach, however, may be to make the reflection gratings in the fiber using a photosensitive fiber. The two arms of the Mach-Zehnder interferometer could be embedded in the same block and use a common distributed feedback filter.

Instead of fiber optics, the wavelength selective optical device of the present invention can also be made using planar waveguide technology. Furthermore complex transmission filter responses can be synthesized by placing aperiodic distributed feedback structures in the loop or in the arms.

The wavelength selective transmission filters of the present invention can find many applications, some being for channel selection and shot-noise control in WDM fiber systems. Because the waveguide reflection filters can easily be tuned, owing to their inherently high finesse, transmission filters made from them can also be made tunable. Other transmission filter applications, related to tunability, are as switching (using intensity-dependent tuning for example) and sensing devices. In addition to its intended function as a wavelength selective tap, the optical device described above can perform several functions that may be useful in the implementation of fiber optic networks. Some of these additional functions result from the fact that in the devices of the present invention which have four ports, only three ports are needed to carry out the wavelength selective function. For example, as a special application, the wavelength selective device can be used in an optical fiber line repeater. In this application, it is assumed that the line is carrying light composed of several discrete wavelengths, the wavelength selective device can be used to extract one of the wavelengths, regenerate the signal and inject it back on to the line on the same carrier wavelength extracted by the tap. In this way, wavelength selective signal drop-and-insert along a high-capacity trunk or LAN can be accomplished. Other speculative uses of the tap could attempt to incorporate active filters in conjunction with optical pumping to implement, for example, a wavelength selective line amplifier.

We claim:

1. A wavelength selective optical device, comprising:
   a first input port,
   a first output port, and
   a first 3 dB optical directional coupler which introduces $\pi/2$ phase shift on light crossover, connecting the said first input and the said first output ports, and wavelength selective resonance circuit means connected symmetrically to the said first 3 dB optical directional coupler, the said resonance circuit means comprising wavelength selecting means capable of reflecting back light having resonant wavelengths and transmitting through light having all other wavelengths so that when singularly polarized light is applied to the said first input port, the light having the said resonant wavelengths and being reflected back from the said wavelength selecting means propagates to the said first output port.

2. The wavelength selective optical device according to claim 1, wherein:
   the said first 3 dB optical directional coupler is a fused tapered fiber optic coupler, and
   the said wavelength selective resonance circuit means comprises a fiber optic loop including Bragg reflection gratings having a resonant wavelength and capable of reflecting back light having the said resonant wavelength and transmitting through light having any other wavelengths, so that when singularly polarized light is applied to the said first input port, the light having only the said resonant wavelength propagates to the said first output port and light having any other wavelengths propagates back to the said first input port.

3. The wavelength selective optical device according to claim 2, wherein:
   the said fiber optic loop includes two or more Bragg reflection gratings, each having a resonant wavelength and capable of reflecting back light having the said resonant wavelength and transmitting through light having any other wavelengths, so that when singularly polarized light is applied to the said first input port, the light having the said resonant wavelengths propagates to the said first output port and light having any other wavelengths propagates back to the said first input port.

4. The wavelength selective optical device, according to claim 1, wherein:
   the said first 3 dB optical directional coupler is a fused tapered fiber optic coupler, and
   the said wavelength selective resonance circuit means comprises a Fabry-Perot resonator having a resonant wavelength and capable of transmitting through light having the said resonant wavelength and reflecting back light having any other wavelengths, so that when singularly polarized light is applied to the said first input port, the light having only the said resonant wavelength propagates back to the said first input port and light having any other wavelengths propagates to the said first output port.

5. The wavelength selective optical device, according to claim 1, wherein:
   the said wavelength selective resonance circuit means comprises two identical Bragg reflection gratings, each having an identical resonant wavelength and capable of reflecting back light having the said resonant wavelength and transmitting through light having any other wavelengths, each of the said Bragg reflection gratings being connected, separately but optically symmetrically with each other, to the said first 3 dB optical directional coupler at one of its two ends and having a light dissipator at the other of the two ends so that when singularly polarized light is applied to the said first input port, the light having the said resonant wavelength propagates to the said first output port and the light having any other wavelength dissipates at the said light dissipators.

6. The wavelength selective optical device, according to claim 5, wherein:

each of the said two identical Bragg reflection gratings is made of plurality of sets of distributed feedback filters, each set having a resonant wavelength and capable of reflecting back light having the said resonant wavelength and transmitting light having any other wavelengths, so that when singularly polarized light is applied to the said first input port, the light having the said resonant wavelengths propagates to the said first output port and light having any other wavelengths dissipates at the said light dissipators.

7. The wavelength selective optical device, according to claim 1, wherein:

the said wavelength selective resonance circuit means comprises a chirping wavelength selective reflective filter having a chirping resonant wavelength and capable of reflecting back light having the resonant wavelengths and transmitting through light having any other wavelengths so that when singularly polarized light is applied to the said first input port, the light having the said resonant wavelengths propagates to the said first output port.

8. The wavelength selective optical device according to claim 7, wherein:

the said wavelength selective resonance circuit means comprises two identical chirping wavelength selective reflective filters, each having identically chirping resonant wavelength and capable of reflecting back light having the resonant wavelength and transmitting through light having any other wavelengths, each of the said filters being connected separately to the said first 3 dB optical directional coupler at one of its two ends and having an optical light dissipator at the other of the two ends, so that when singularly polarized light is applied to the said first input port, the light having the said resonant wavelengths propagates to the said first output port and the light having any other wavelengths dissipates at the said light dissipators.

9. The wavelength selective optical device, according to claim 1, wherein:

the said wavelength selective resonance circuit means further comprises a second 3 dB optical directional coupler which introduces $\pi/2$ phase shift on light crossover and has a second input port and a a second output port, the said second 3 dB optical directional coupler and the said wavelength selecting means being symmetrically connected to the said first 3 dB optical directional coupler, so that when singularly polarized light is applied to the said first input port, the light having the said resonant wavelength and being reflected back from the said wavelength selecting means propagates to the said first output port and the light having any other wavelengths propagates to the said second output port.

10. The wavelength selective optical device, according to claim 9, wherein:

the said first and second 3 dB optical directional couplers are each made of a fused tapered fiber optic coupler and are connected to one another by identical optical arms, each of the said optical arms containing one or more identical Bragg reflection gratings, each grating having a resonant wavelength, so that singularly polarized light having the said resonant wavelengths propagates from the said first input port to the said first output port and light having any other wavelengths propagates from the said first input port to the said second output port.

* * * * *